(12) United States Patent
Kaplan

(10) Patent No.: US 12,437,372 B2
(45) Date of Patent: Oct. 7, 2025

(54) SYSTEM AND METHOD FOR DENOISING A REGION OF INTEREST OF A PATTERN

(71) Applicant: ETROLOGY, LLC, Sandy, OR (US)

(72) Inventor: Vladislav Kaplan, Baanana (IL)

(73) Assignee: ETROLOGY, LLC, Sandy, OR (US)

( * ) Notice: Subject to any disclaimer, the term of this patent is extended or adjusted under 35 U.S.C. 154(b) by 425 days.

(21) Appl. No.: 18/308,217

(22) Filed: Apr. 27, 2023

(65) Prior Publication Data

US 2024/0362755 A1    Oct. 31, 2024

(51) Int. Cl.
*G06T 5/70* (2024.01)
*G06T 5/20* (2006.01)
*G06T 7/00* (2017.01)

(52) U.S. Cl.
CPC ............. *G06T 5/70* (2024.01); *G06T 5/20* (2013.01); *G06T 7/0006* (2013.01); *G06T 2207/10061* (2013.01); *G06T 2207/20081* (2013.01); *G06T 2207/20084* (2013.01); *G06T 2207/30148* (2013.01)

(58) Field of Classification Search
None
See application file for complete search history.

(56) References Cited

U.S. PATENT DOCUMENTS

| | | | |
|---|---|---|---|
| 11,677,051 B1 * | 6/2023 | Brodoceanu | H10H 20/852 438/26 |
| 2017/0200264 A1 * | 7/2017 | Park | G06T 7/001 |
| 2017/0200265 A1 * | 7/2017 | Bhaskar | G06T 7/0004 |
| 2018/0330511 A1 * | 11/2018 | Ha | G06F 30/00 |
| 2019/0096659 A1 * | 3/2019 | Xu | G06F 9/30003 |
| 2019/0328348 A1 * | 10/2019 | De Man | G06T 5/20 |
| 2020/0013157 A1 * | 1/2020 | Swanson | G06T 7/001 |
| 2020/0234402 A1 * | 7/2020 | Schwartz | G06T 5/70 |
| 2021/0343001 A1 * | 11/2021 | Grama | G03F 7/7065 |
| 2024/0118545 A1 * | 4/2024 | Kim | G02B 5/18 |

FOREIGN PATENT DOCUMENTS

WO    WO-2023111772 A1 *    6/2023    ............ G06T 5/10

* cited by examiner

*Primary Examiner* — Jiangeng Sun
(74) *Attorney, Agent, or Firm* — Stanzione & Associates, PLLC; Patrick Stanzione

(57) ABSTRACT

A system and method for denoising a grey scale image of a pattern on a substrate, including: scanning an electron beam along a pattern, detecting a scan line waveform from the scanned electron beam, obtaining a model scan line waveform from the detected scan line waveform, augmenting the model scan line waveform and adding noise to the augmented model scan line waveform, inputting the noisy augmented model scan line through a deep learning neural network (DNN) process, comparing the output of the DNN process to the augmented model scan line waveform before noise is added, and backpropagating the compared results into the DNN process to obtain a noise discrimination function.

9 Claims, 7 Drawing Sheets

FIG. 1
(CONVENTIONAL)
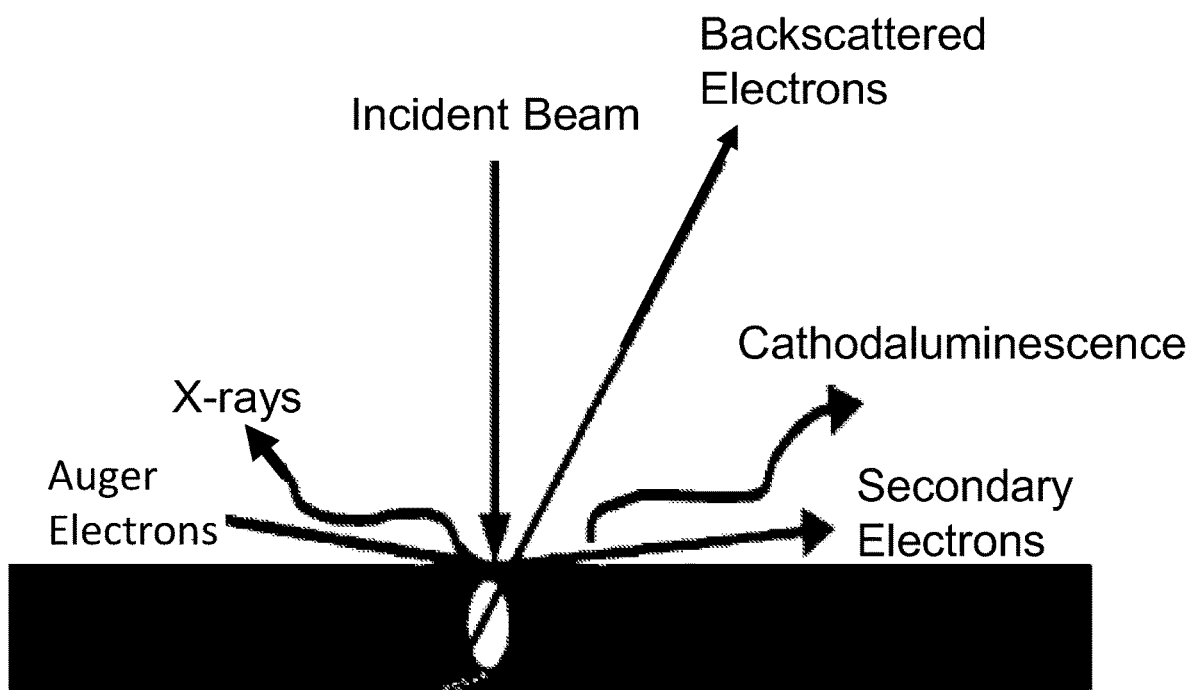

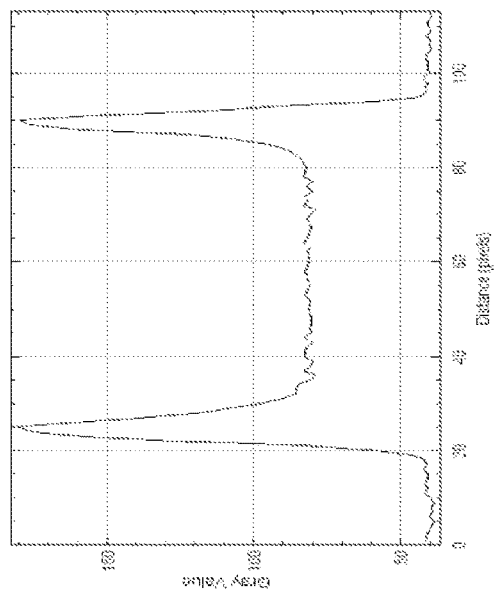
FIG. 2C (CONVENTIONAL)
Model scanline (clean)
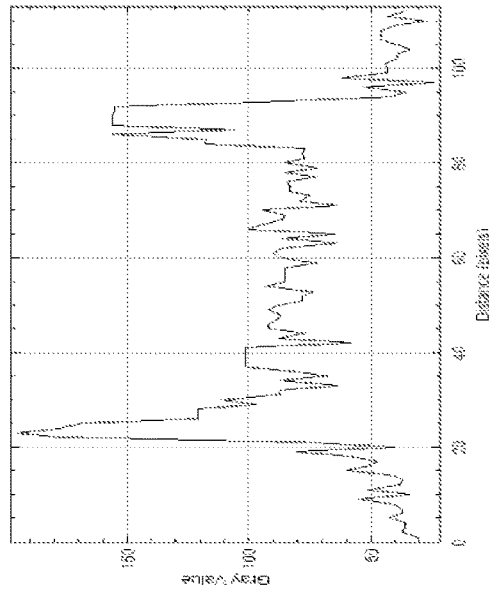
FIG. 2B (CONVENTIONAL)
One scanline (noisy)
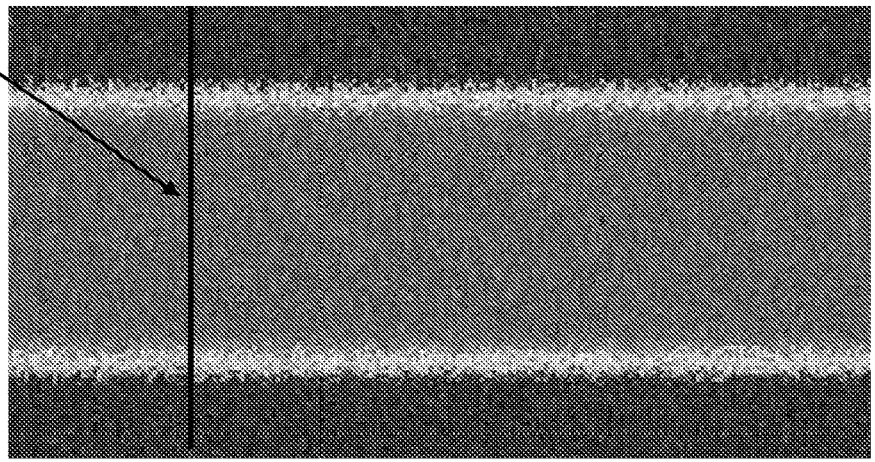
FIG. 2A (CONVENTIONAL)

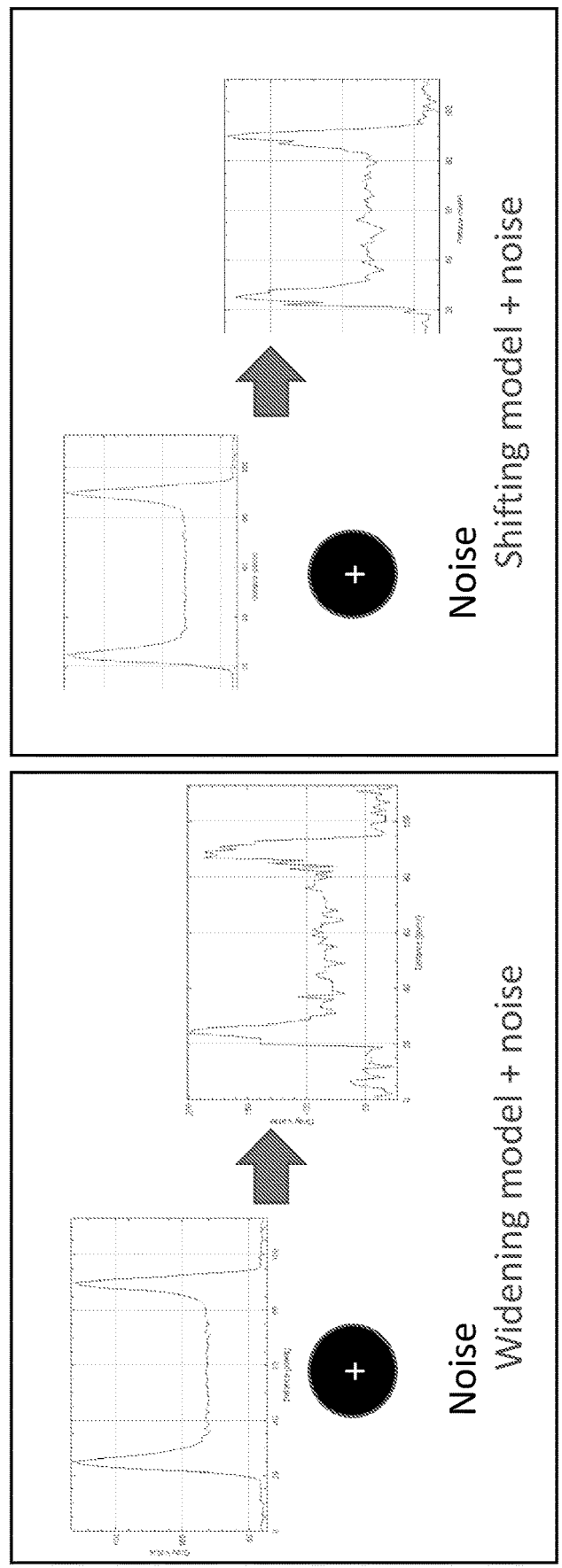

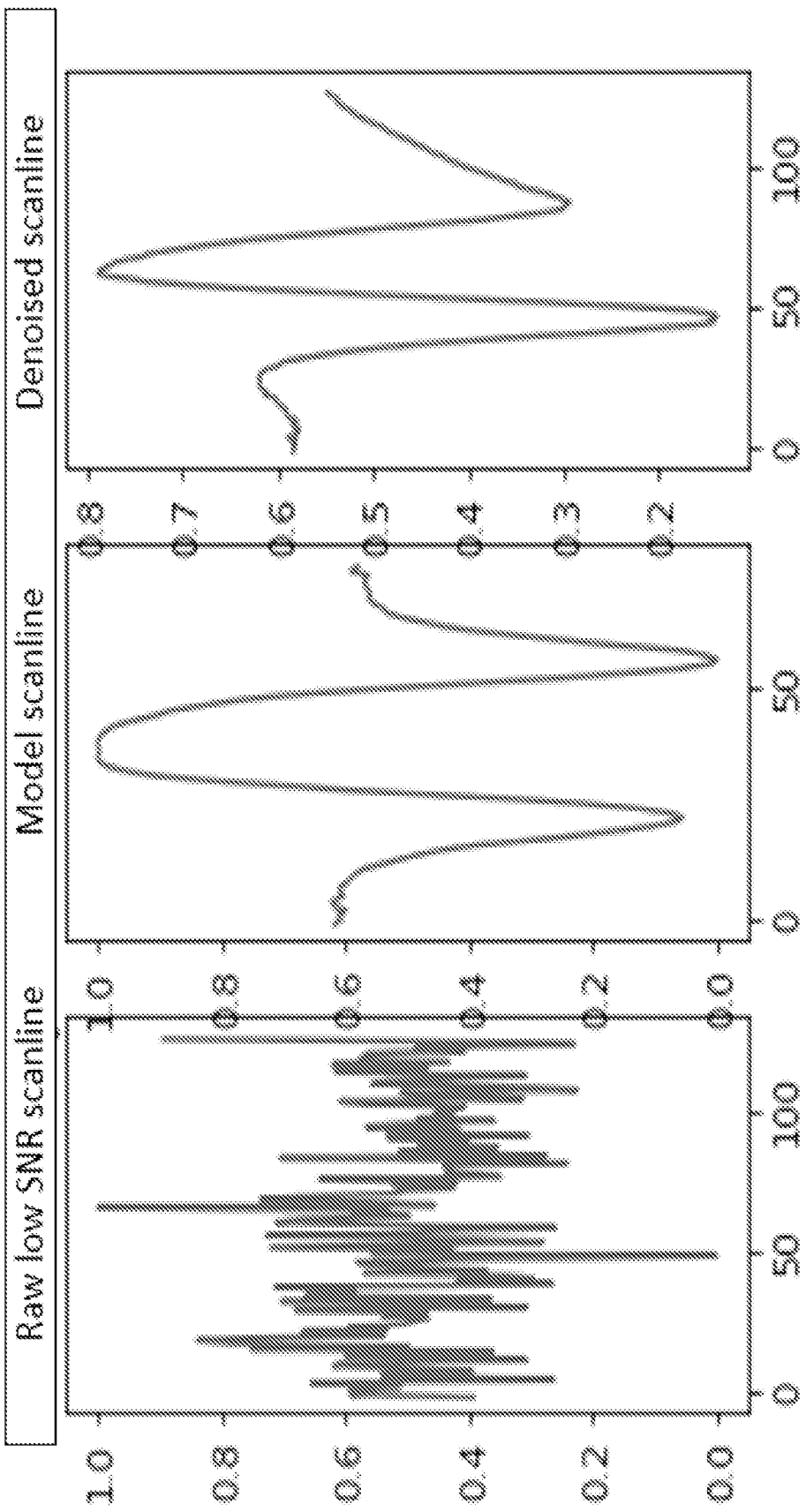

SYSTEM AND METHOD FOR DENOISING A REGION OF INTEREST OF A PATTERN

STATEMENT REGARDING FEDERALLY SPONSORED RESEARCH OR DEVELOPMENT

Not applicable.

COPYRIGHT NOTICE

A portion of this disclosure contains material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever. 37 C.F.R 1.71 (d).

BACKGROUND OF THE INVENTIVE CONCEPT

1. Field of the Invention

The present inventive concept relates to denoising of critical dimension scanning electron microscopy. More particularly, but not exclusively, this inventive concept relates to denoising of critical dimension scanning electron microscopy by one dimensional (1D) artificial intelligence (AI) denoising for critical dimension (CD) metrology.

Description of the Related Art

Measuring a pattern, generally formed on or within a substrate, in order to detect imperfections which can cause faulty circuits, is a well-known process. This process is referred to as critical dimension (CD) scanning electron microscopy (CDSEM). Generally, in CD scanning electron microscopy (CDSEM), an electronic image is obtained from an area of a sample to be tested. The area to be sampled comprises a pattern and the electron image obtained comprises a plurality of signals obtained from lines scanned, with an electron beam, across the pattern, where each scanned line detected generates a signal. These signals include information obtained by scanning the electron beam over a scanline across the pattern and between the vertical edges of the pattern (a leading edge and a trailing edge of the pattern). For each scan line two peaks (representing the edges) must be located, and the distance between the peaks (the critical dimension (CD)) is measured.

Waveforms are obtained from the signals and stored as result of the interaction of scanning an electron beam on a surface along the scanlines across the pattern, and these waveforms are converted into a grey scale image of the pattern. However, these resulting waveforms that are converted into a grey scale image, in most cases, are very noisy and difficult to read. Furthermore, measuring each scanline separately in order to determine the edges of the pattern creates a highly inaccurate measurement. Accordingly, "denoising" of the obtained grey scale image is one of the most important parts in the image preprocessing techniques, and denoising is generally applied before measurement of the obtained waveform.

At the beginning of critical dimension (CD) metrology, denoising was merely supported by kernel operations, which were capable of being performed sufficiently enough at a high signal-to-noise ratio (SNR) of a scanline. At this time, denoising was purely one dimensional (1D). Further requirements in the semiconductor industry, such as throughput increase and damage reduction, has caused manufacturers of critical dimension scanning electron microscopy (CDSEM) equipment to look for more elaborate solutions, such as bilateral filtering, Markov-Chain based filtering for segmentation and non-local means, etc., which were more capable for SNR challenges-mostly two-dimensional (2D) classical denoising. In the past decade development of artificial intelligence (AI) based solutions created some architectures which could be naturally used as denoisers, although they were built for other purposes, namely, as object classifiers and regressors. There was a significantly high incentive to use these AI based architectures in their natural environment: 2D classification/2D regression, which means to directly create Convolutional Neural Networks (CNN) architecture for 2D denoising of images. This attempt was successful enough in general, apart from the fact that 2D denoising based on a high frame high SNR model was not quite adaptable to the rest of the common CD measurement application programming interfaces (API). For example, training time in "recipe creation mode" generally took ten or more minutes due to the necessity to create augmentation and to train significant areas of 2D space. Moreover, in some cases results achieved for precision and accuracy were not quite sufficient, and even inferior to classical 2D denoising techniques.

Accordingly, there is a need to create a filter for denoising which significantly reduces the amount of time compared to 2D denoising techniques.

Accordingly, there is also a need to improve results of precision and accuracy in the measurement of waveforms obtained from electron beam scanning of a pattern.

SUMMARY OF THE INVENTIVE CONCEPT

The present general inventive concept provides a system and method for denoising of critical dimension scanning electron microscopy. More particularly, but not exclusively, this inventive concept provides a system and method for denoising of critical dimension scanning electron microscopy by gaussian weighted averaging of scanlines of a pattern Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a method of denoising electron image measurement waveforms of a pattern, the method comprising: scanning an electron beam across a pattern of interest on a substrate; detecting a single scan line waveform of the scanned electron beam; obtaining a model one-dimensional (1D) scan line waveform from the detected scan line waveform; augmenting the (1D) model scan line waveform by performing at least one of squeezing, widening, skewing and shifting the model scan line waveform to obtain clean (1D) augmented model data and adding noise to the at least one of a squeezed, widened, skewed and shifted versions of the (1D) model scan line waveform to obtain noisy augmented data; applying a deep learning neural network process to the noisy (1D) augmented data; comparing the output of the deep neural network training process to the clean (1D) augmented model data to obtain a minimal square error; and iteratively updating parameters of the deep neural network training process by backpropagating the obtained minimal square error obtained into the deep neural network training process to create a noise discrimination function.

In an exemplary embodiment the augmenting the (1D) model scan line waveform can include squeezing, widening, skewing and shifting the model scan line waveform to obtain clean augmented model data and adding noise to the squeezed, widened, skewed and shifted versions of the (1D) model scan line waveform to obtain noisy (1D) augmented data.

In another exemplary embodiment the pattern is an area of an electronic circuitry formed on a substrate.

The foregoing and/or other features and utilities of the present general inventive concept may also be achieved by providing a non-transitory computer readable medium that stores instructions to perform the process steps of: scanning an electron beam across a pattern of interest on a substrate; detecting a one-dimensional (1D) scan line waveform of the scanned electron beam; obtaining a (1D) model scan line waveform from the detected scan line waveform; augmenting the (1D) model scan line waveform by performing at least one of squeezing, widening, skewing and shifting the (1D) model scan line waveform to obtain clean augmented (1D) model data and adding noise to the at least one of a squeezed, widened, skewed and shifted versions of the (1D) model scan line waveform to obtain noisy (1D) augmented data; applying a deep neural network training process to the noisy (1D) augmented data; comparing the output of the deep neural network training process to the clean augmented (1D) model data to obtain a minimal square error; and iteratively updating parameters of the deep neural network training process by backpropagating the obtained minimal square error obtained into the deep neural network.

In an exemplary embodiment the augmenting the (1D) model scan line waveform can include squeezing, widening, skewing and shifting the model scan line waveform to obtain clean augmented (1D) model data and adding noise to the squeezed, widened, skewed and shifted versions of the (1D) model scan line waveform to obtain noisy (1D) augmented data.

In an exemplary embodiment the pattern is an area of electronic circuitry formed on a substrate.

The foregoing and/or other features and utilities of the present general inventive concept may also be achieved by providing a system to denoise electron image measurement waveforms of a pattern, the system comprising: an electronic beam to scan across a pattern; a detector to detect a one-dimensional (1D) scan line waveform from the scanned electron beam; a memory to store the detected (1D) scan line waveform; a model scan line waveform device to obtain a (1D) model scan line waveform of the detected (1D) scan line waveform; an augmentation unit to perform at least one type of augmentation on the (1D) model scan line waveform and to add noise to the at least one type of augmented (1D) model scan line waveform; a deep learning neural network to perform deep neural network processing on the augmented (1D) model scan line waveform with noise added; a comparator to compare the processed augmented (1D) model scan line waveform with noise added to the augmented (1D) model scan line waveform before noise is added to obtain minimal square error; and backpropagating unit to iteratively update parameters of the deep learning neural network by backpropagating the obtained minimal square error obtained into the deep learning neural network to create a noise discrimination function.

In an exemplary embodiment the augmentation unit can perform squeezing, widening, skewing and shifting the model scan line waveform to obtain clean augmented (1D) model data and adds noise to the squeezed, widened, skewed and shifted versions of the model scan line waveform to obtain noisy augmented (1D) data.

In another exemplary embodiment the pattern is an area of electronic circuitry formed on a substrate.

BRIEF DESCRIPTION OF THE DRAWINGS

These and/or other features and utilities of the present inventive concept will become apparent and more readily appreciated from the following description of the embodiments, taken in conjunction with the accompanying drawings of which:

FIG. 1 illustrates a single electron bean scan line across a pattern;

FIG. 2A illustrates a single scan line a pattern;

FIG. 2B illustrates a waveform of the scan line across the pattern illustrated in FIG. 1A;

FIG. 2C illustrates a waveform of a model scan line obtained from the scan line illustrated in FIG. 2B;

FIG. 3C illustrates a process of augmenting the model scan line by widening the model scanline illustrated in FIG. 2C and adding noise to the widened model scan line;

FIG. 3D illustrates a process of augmenting the model scan line by shifting the model scanline illustrated in FIG. 2C and adding noise to the shifted model scan line;

FIGS. 6A-6C illustrate the stages of a waveform from a detected scan line of an electron beam scanned across a pattern to a denoised version of the waveform of the detected scan line, according to an example embodiment of the present inventive concept.

Figure 3B:
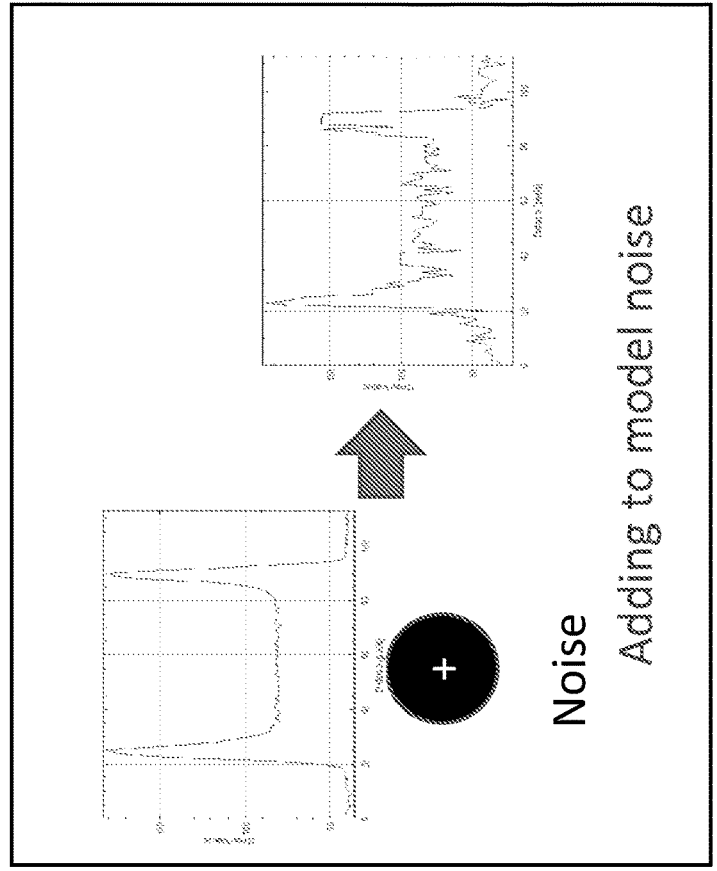
FIG. 3B illustrates a process of augmenting the model scan line by squeezing the model scanline illustrated in FIG. 2C and adding noise to the squeezed model scan line.
Figure 3A:
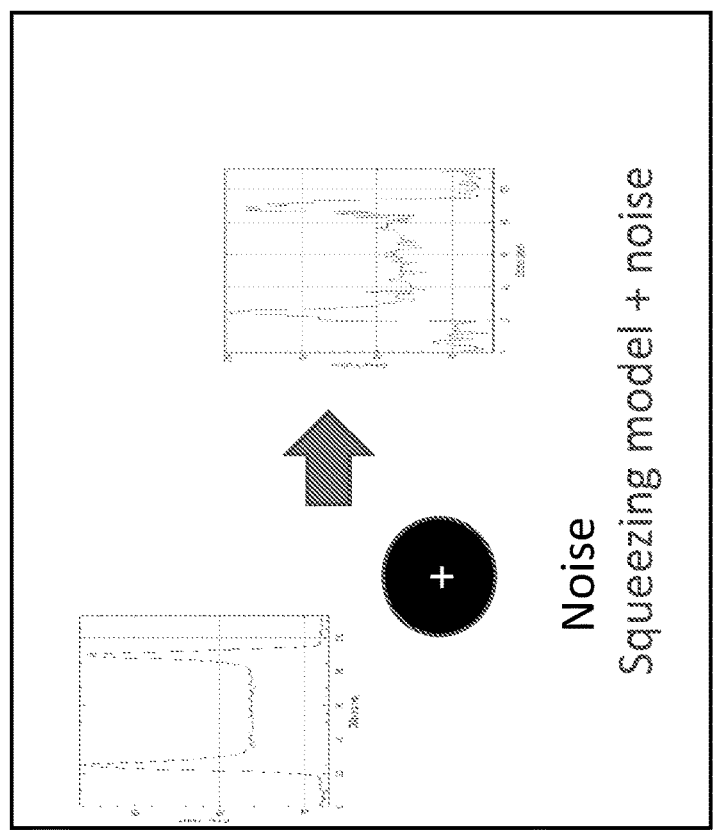
FIG. 3A illustrates a noise being added to the model scanline illustrated in FIG. 2C, according to an example embodiment of the present inventive concept.

The drawings illustrate a few example embodiments of the present inventive concept, and are not to be considered limiting in its scope, as the overall inventive concept may admit to other equally effective embodiments. The elements and features shown in the drawings are to scale and attempt to clearly illustrate the principles of exemplary embodiments of the present inventive concept. In the drawings, reference numerals designate like or corresponding, but not necessarily identical, elements throughout the several views.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures. Also, while describing the present general inventive concept, detailed descriptions about related well-known functions or configurations that may diminish the clarity of the points of the present general inventive concept are omitted.

It will be understood that although the terms "first" and "second" may be used herein to describe various elements, these elements should not be limited by these terms. These terms are only used to distinguish one element from another element. Thus, a first element could be termed a second element, and similarly, a second element may be termed a first element without departing from the teachings of this disclosure.

Expressions such as "at least one of," when preceding a list of elements, modify the entire list of elements and do not modify the individual elements of the list.

All terms including descriptive or technical terms which are used herein should be construed as having meanings that are obvious to one of ordinary skill in the art. However, the terms may have different meanings according to an intention of one of ordinary skill in the art, case precedents, or the appearance of new technologies. Also, some terms may be arbitrarily selected by the applicant, and in this case, the meaning of the selected terms will be described in detail in the detailed description of the invention. Thus, the terms used herein have to be defined based on the meaning of the terms together with the description throughout the specification.

Also, when a part "includes" or "comprises" an element, unless there is a particular description contrary thereto, the part can further include other elements, not excluding the other elements. In the following description, terms such as "unit" and indicate a unit to process at least one function or operation, wherein the unit may be embodied as hardware or software or embodied by combining hardware and software.

Hereinafter, one or more exemplary embodiments of the present general inventive concept will be described in detail with reference to accompanying drawings.

The subject matter regarded as the embodiments of the disclosure is particularly pointed out and distinctly claimed in the concluding portion of the specification. The embodiments of the disclosure, however, both as to organization and methods of operation, together with objects, features, and advantages thereof, may best be understood by reference to the following detailed description when read with the accompanying drawings.

Because the illustrated embodiments of the disclosure may be implemented using electronic components and circuits know to those skilled in the art, details will not be explained in any greater extent than that considered necessary as illustrated, for the understanding and appreciation of the underlying concepts of the present example embodiments described herein and in order not to obfuscate or distract from the overall inventive concept as described herein.

Any reference in the specification to a method should be applied mutatis mutandis to a system capable of executing the method and should be applied mutatis mutandis to a computer readable medium that is non-transitory and stores process steps for executing the method.

Any reference in the specification to a system should be applied mutatis mutandis to a method that may be executed by the system and should be applied mutatis mutandis to a computer readable medium that is non-transitory and stores process steps for executing the system.

Any reference in the specification to a computer readable medium that is non-transitory should be applied mutatis mutandis to a method that may be applied when executing instructions stored in the computer readable medium and should be applied mutatis mutandis to a system configured to execute the process steps stored in the computer readable medium.

There may be provided a system, a method, and a non-transitory computer readable medium for denoising of critical dimension scanning electron microscopy by . . .

An electron beam generator, or other particle beam generator, is well-known to be used to generate a beam. This beam can be scanned along scan lines across a pattern formed in or on a substrate. The beam is generally scanned consecutively across a pattern, one scan line after another, to cover an entire field of view (FOV) of the pattern. A region of interest (ROI) is referred to as a portion of the FOV which will be extracted for processing, which will also be referred to as a window of scan lines throughout this detailed description.

When an electron beam (or other beam scannable across a pattern to obtain a signal representing an area of the pattern) is scanned across a pattern, both secondary electrons and backscattered electrons are emitted, which can be detected by a secondary electron detector and a backscattered detector, respectively, in order to obtain electron image data (or signals) for each scanline. More specifically, for every instance of time $t_i$ a primary beam (i.e., the electron beam) will move across the surface of a pattern (i.e., in the x direction) at a location $X_i$, $Y_i$. Every intersection between the primary beam and the surface of the pattern along the x direction at an instance of time $t_i$ results in the ejection of secondary and backscattered electrons which are used to form the signals.

FIG. 1 illustrates the emission of secondary electrons and backscatter electrons from the incident electron beam onto a pattern. It is to be noted that other types of electrons are also ejected from the pattern as a result of the electron beam intersecting with the surface of the pattern, which will not be addressed here in order to provide brevity of the detailed description.

It is well known that different amounts of ejected secondary electrons and ejected backscattered electrons occur depending on whether the beam is intersecting with an edge or with a flat region of the pattern. The ejected secondary electrons and backscattered electrons are converted to a grey level signal by a respective photomultiplier detector(s) (PMT) and a video multiplier. The collection of these signals over all points $(X_i, Y_i)$ located along the pattern will form a 2D image at grey scale level. This 2D image is stored in a memory and can be transferred to a CRT/LCD screen. However, since there is a substantial amount of both secondary and backscattered electrons, this results in a substantial amount of noise within the grey scale level image. Accordingly, each scan line needs to be cleaned of noise in order to obtain a readable measurement.

As pointed out supra, 2D denoising based on a high frame high SNR has not been quite adaptable to the rest of the common CD measurement application programming interfaces (API). For example, the training time in recipe creation mode takes ten or more minutes due to the necessity to create augmentation and to train significant areas of space, and in some cases results achieved for precision and accuracy have not been impressive, and have even been inferior to classical 2D denoising techniques.

Accordingly, the present inventive concept relates to denoising of critical dimension scanning electron microscopy by one dimensional (1D) artificial intelligence (AI) denoising for critical dimension (CD) metrology. More particularly, but not exclusively, the present inventive concept relates to denoising of critical dimension scanning electron microscopy by one dimensional (1D) artificial intelligence (AI) denoising by creating a denoising filter which is much faster and more accurate due to the fact that augmentation and inference for a one dimensional (1D) signal is significantly faster and is based on much more augmentation data as well as a large variety of augmented data.

FIG. 2A illustrates where an electron beam (horizontal scan line SL) has been scanned across a pattern formed within or on a substrate. The detected secondary electrons and backscatter electrons from the incident electron beam scanned across the pattern are stored in a memory for processing. FIG. 2B illustrates a display of one scan line result detected across the pattern illustrated in FIG. 2A. It is to be noted that a scan line is not limited to being obtained by scanning an electron beam across a pattern formed within or on a substrate, and can be obtained by other types of beams being scanned across other patterns of electronic circuitry formed on or within other types of bases/foundations.

As illustrated in FIG. 2B, the detected signal from a single scan line is generally a very noisy signal. Accordingly, a "model" scan line is desired to be obtained from the noisy signal in order to be able to successfully process the detected scan line signal. FIG. 2C illustrates a "model scan line" of the detected scan line illustrated in FIG. 2B. A model scan line can be obtained by a variety of different known methods, such as: a) known noise suppression methods; b) by physical interaction with the scan line, such as applying more current, energy or exposure; c) by exporting the scan line from tools, such as AFM, VSEM, High resolution SEM or scatterometry/ellipsometry; or by d) running numerical simulation methods on SEM surface interaction. A model (1D) scan line waveform can also be exported from another type of tool or tools to obtain a better matching between model (1D) scan line waveforms from two different model creation tools.

In an example embodiment, an obtained (1D) model scan line can be denoised by first performing augmentation of the 1D model scan line to create new slightly modified copies of the 1D model scan line. As illustrated in FIGS. 3A-3D, augmenting the 1D model scan line can be performed by squeezing the 1D model scan line, by widening the 1D model scan line with different shifts and magnifications and by shifting the 1D model scan line to the left and to the right. Augmenting the 1D model scan line can also be performed by skewing the 1D model scan line. Further, noise can be added to the 1D scan line each time the scan line is squeezed, as illustrated in FIG. 3B, noise can be added to the 1D scan line each time the scan line is widened and narrowed, as illustrated in FIG. 3C, and noise can be added to the 1D scan line each time the scan line is shifted to the left and to the right, as illustrated in FIG. 3D. Noise can also be added to the 1D scan line each time the scan line is skewed. This process of augmenting the 1D model scan line the variety of different ways and adding noise to the augmented 1D model scan line, as illustrated in FIGS. 3A-3D, can be repeated until a sufficient amount of noisy 1D augmented scan lines are created. As a result of augmentation of the 1D model scan line and adding noise to each augmentation version, both clean augmented data (scan lines) and noisy augmented data (scan lines) is be obtained.

Figure 4:
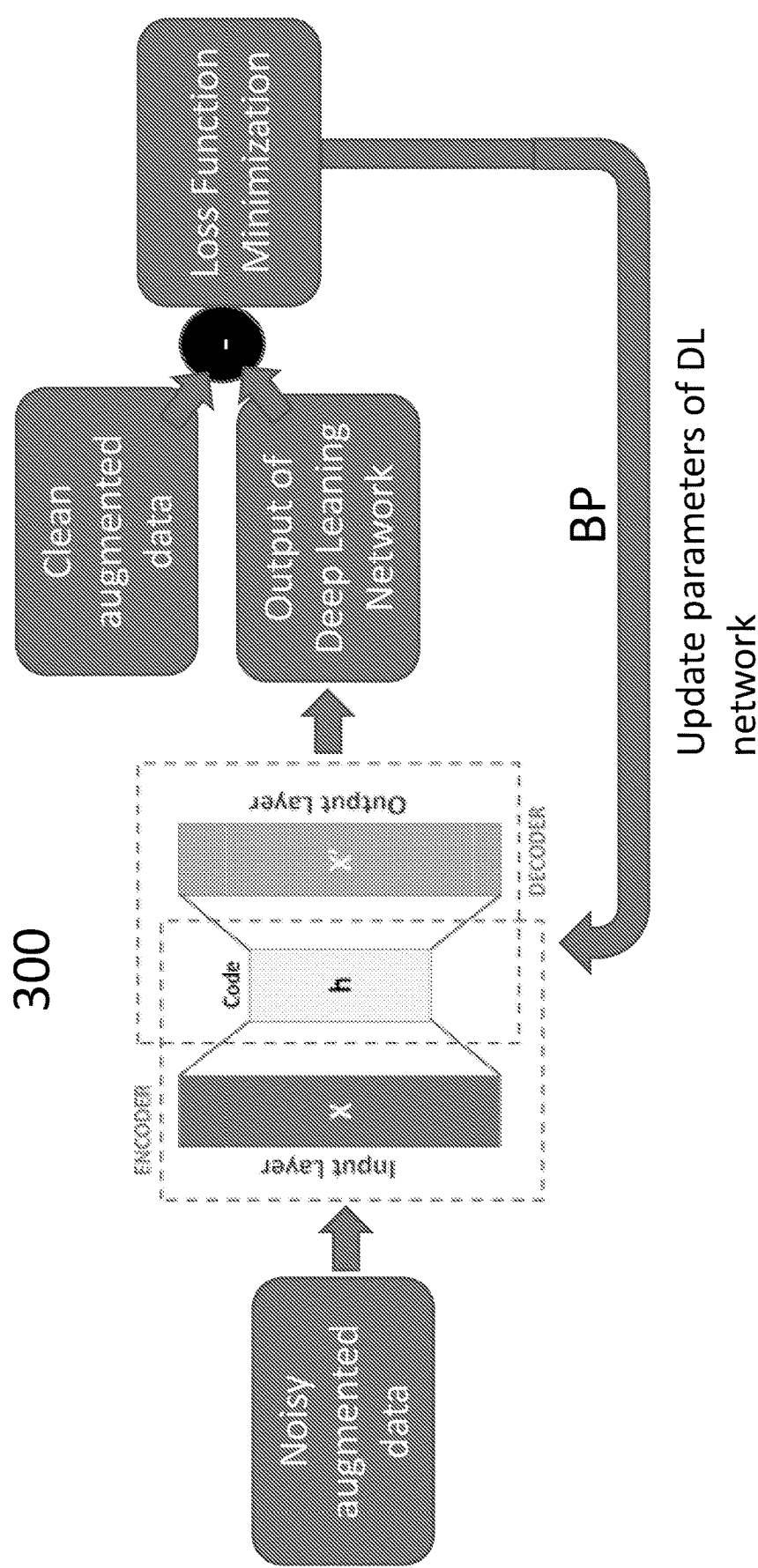
FIG. 4 illustrates a process of creating a deep neural network model denoiser using the noisy and clean augmented versions of the model scan line, according to an example embodiment of the present inventive concept.

The noisy augmented data (scan lines) can be input to a training deep neural network (DNN) learning engine. FIG. 4 illustrates an autoencoder or deep neural network (DNN) learning engine 300. DNNs are well known architectures which use machine learning algorithms with multiple layers to progressively extract higher-level features from raw input data, and therefore the structures and details thereof will not be described in detail. A deep neural network (DNN) is an artificial neural network (ANN) with multiple "hidden layers" between input and output layers, where the hidden layers include artificial neurons that are trained from input data. In other words, DNN architectures generate composite models where the object is expressed at a layered composition of primitives. Although there are different types of neural networks to perform deep learning/training, in general neural networks always consist of the same components: neurons, synapses, weights, biases and functions.

As illustrated in FIG. 4, the obtained noisy augmented 1D model data can be input at an input layer X of a deep neural network (DNN), such as DNN 300. An output of the deep learning neural network (DNN) 300 at an output layer X' can be compared with the clean augmented model data to define a "Loss Function," in this case a Minimal Square Error (MSE). As illustrated in FIG. 4, an algorithm for gradient descent can be provided to update the neural network parameters of the deep learning neural network (DNN) 300 through backpropagation (BP). Performing the processes described above with respect to FIGS. 3A-3D and FIG. 4, iteratively until a sufficient amount of noisy augmented data has been processed, will result in a noise discrimination function embedded into the deep learning neural network (DNN) 300.

Figure 5:
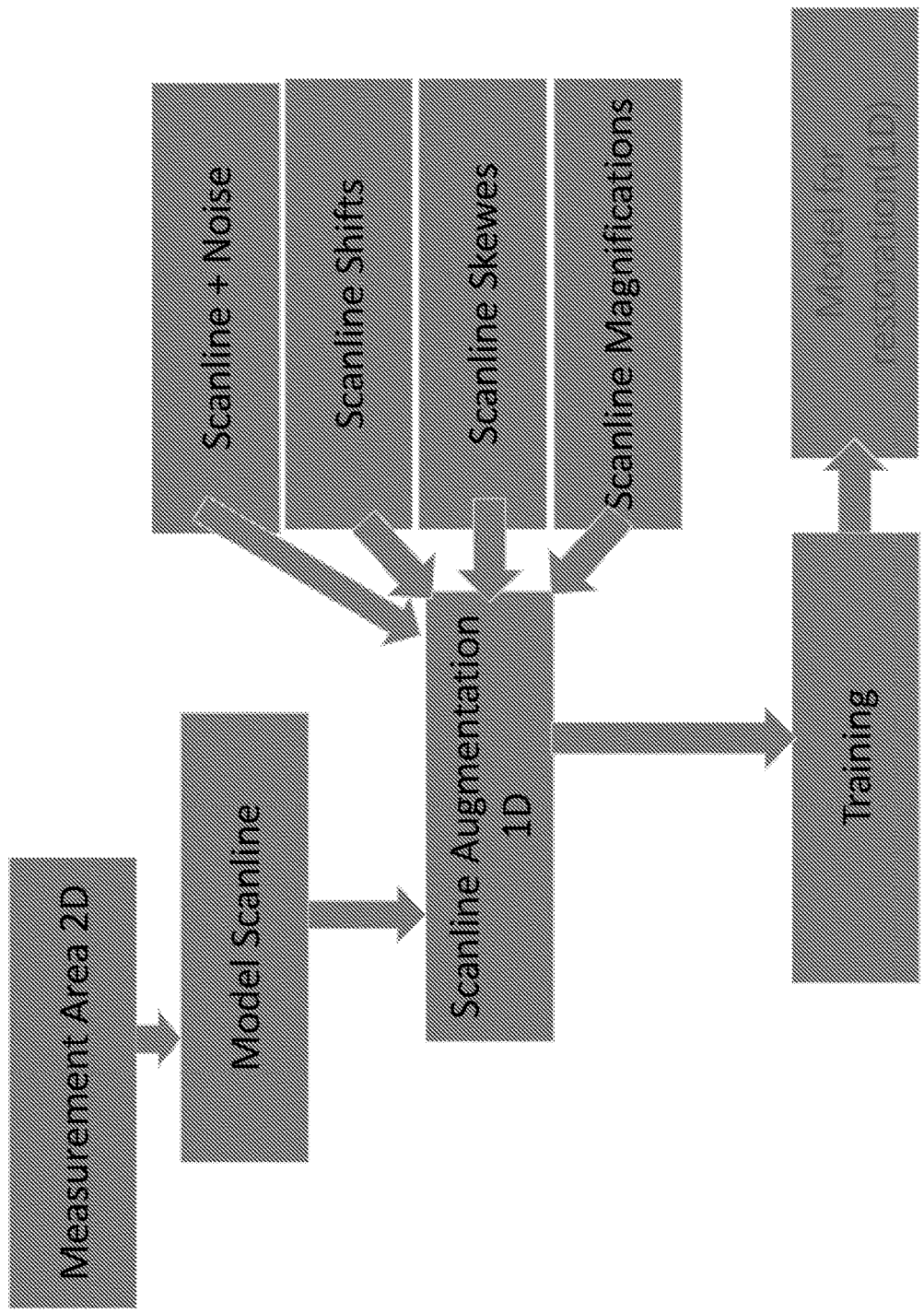
FIG. 5 illustrates a training flow diagram of the process of a one-dimensional AI denoiser according to an example embodiment of the present inventive concept.

FIG. 5 illustrates a training flow diagram of the process of a one dimensional AI denoiser according to an example embodiment of the present inventive concept. As illustrated in FIG. 5, an area of a pattern is scanned and detected to obtain a scan signal. From the scan signal a model scan line can be obtained as described above. Then augmentation of the model scan line in one dimension (1D) is performed by squeezing the 1D model scan line and then adding noise while squeezing the 1D model scan line, by widening (or magnifying) the 1D model scan line and then adding noise while widening the 1D model scan line, by skewing the 1D model scan line and then adding noise while skewing the 1D model scan line, and by shifting the 1D model scanline and then adding noise while shifting the 1D model scan line. Then the augmented 1D model scan line with noise added can be input to a DNN learning engine to train the deep learning network, as illustrated in FIG. 4.

As a result of the above described process fast DNN model creation can be performed due to the 1D "reduced" DNN architecture as compared to a 2D DNN architecture. The DNN model creation from a 1D reduced DNN architecture can be used as an instant self-trained denoiser in the case of high CPU/GPU engine support. In addition, it is possible to create a large variety of augmented training sets due to the simplicity of the 1D architecture.

FIGS. 6A-6C illustrate different stages from a detected signal obtained from an electron beam scanned across a pattern to creating a model scan line to a denoised scan line using the process described above with reference to FIGS. 3A-3D, FIG. 4 and FIG. 5. More specifically, FIG. 6A illustrates one scan line of the beam across a pattern (waveform), FIG. 2B illustrates an obtained model scan line (waveform) from the waveform illustrated in FIG. 6A, and FIG. 6C illustrates the scan line denoised after creation of the deep learning model (using the deep neural network DNN) scan line by the inventive process described above with reference to FIGS. 3A-3D, FIG. 4 and FIG. 5.

While certain features of the example embodiments of the present inventive concept as described herein have been illustrated and described, many modifications, substitutions, changes, and equivalents will now occur to those of ordinary skill in the art. It is therefore to be understood that the appended claims are intended to cover all such modifications and changes as fall within the spirit and scope of the embodiments as described herein.

The embodiments described herein may also be implemented in a computer program to be used to run a computer system, at least including code portions for performing process steps according to the embodiments when run on a programmable apparatus, such as a computer system, or enabling a programmable apparatus to perform functions of a device or system according to the example embodiments.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A method of denoising electron image measurement waveforms of a pattern, the method comprising:
    scanning an electron beam across a pattern of interest on a substrate;
    detecting a single scan line waveform of the scanned electron beam;
    obtaining a model one-dimensional (1D) scan line waveform from the detected scan line waveform;
    augmenting the (1D) model scan line waveform by performing at least one of squeezing, widening, skewing and shifting the model scan line waveform to obtain clean (1D) augmented model data and adding noise to the at least one of a squeezed, widened, skewed and shifted versions of the (1D) model scan line waveform to obtain noisy augmented data;
    applying a deep learning neural network process to the noisy (1D) augmented data;
    comparing the output of the deep neural network training process to the clean (1D) augmented model data to obtain a minimal square error; and
    iteratively updating parameters of the deep neural network training process by backpropagating the obtained minimal square error obtained into the deep neural network training process to create a noise discrimination function.

2. The method according to claim 1, wherein the augmenting the (1D) model scan line waveform includes squeezing, widening, skewing and shifting the model scan line waveform to obtain clean augmented model data and adding noise to the squeezed, widened, skewed and shifted versions of the (1D) model scan line waveform to obtain noisy (1D) augmented data.

3. The method according to claim 1, wherein the pattern is an area of an electronic circuitry formed on a substrate.

4. A non-transitory computer readable medium that stores instructions to perform the process steps of:
    scanning an electron beam across a pattern of interest on a substrate;
    detecting a one-dimensional (1D) scan line waveform of the scanned electron beam;
    obtaining a (1D) model scan line waveform from the detected scan line waveform;
    augmenting the (1D) model scan line waveform by performing at least one of squeezing, widening, skewing and shifting the (1D) model scan line waveform to obtain clean augmented (1D) model data and adding noise to the at least one of a squeezed, widened, skewed and shifted versions of the (1D) model scan line waveform to obtain noisy (1D) augmented data;
    applying a deep neural network training process to the noisy (1D) augmented data;
    comparing the output of the deep neural network training process to the clean augmented (1D) model data to obtain a minimal square error; and
    iteratively updating parameters of the deep neural network training process by backpropagating the obtained minimal square error obtained into the deep neural network training process to create a noise discrimination function.

5. The non-transitory computer readable medium according to claim 4, wherein the augmenting the (1D) model scan line waveform includes squeezing, widening and shifting the model scan line waveform to obtain clean augmented (1D) model data and adding noise to the squeezed, widened, skewed and shifted versions of the (1D) model scan line waveform to obtain noisy (1D) augmented data.

6. The non-transitory computer readable medium according to claim 5, wherein the pattern is an area of electronic circuitry formed on a substrate.

7. A system to denoise electron image measurement waveforms of a pattern, the system comprising:
    an electronic beam to scan across a pattern;
    a detector to detect a one-dimensional (1D) scan line waveform from the scanned electron beam;
    a memory to store the detected (1D) scan line waveform;
    a model scan line waveform device to obtain a (1D) model scan line waveform of the detected (1D) scan line waveform;
    an augmentation unit to perform at least one type of augmentation on the (1D) model scan line waveform and to add noise to the at least one type of augmented (1D) model scan line waveform;
    a deep learning neural network to perform deep neural network processing on the augmented (1D) model scan line waveform with noise added;
    a comparator to compare the processed augmented (1D) model scan line waveform with noise added to the augmented (1D) model scan line waveform before noise is added to obtain minimal square error; and
    backpropagating unit to iteratively update parameters of the deep learning neural network by backpropagating the obtained minimal square error obtained into the deep learning neural network to create a noise discrimination function.

8. The system according to claim 7, wherein the augmentation unit performs squeezing, widening, skewing and shifting the model scan line waveform to obtain clean augmented (1D) model data and adds noise to the squeezed, widened, skewed and shifted versions of the model scan line waveform to obtain noisy augmented (1D) data.

9. The system according to claim 7, wherein the pattern is an area of electronic circuitry formed on a substrate.

* * * * *